United States Patent [19]

Welch

[11] Patent Number: 4,939,926
[45] Date of Patent: Jul. 10, 1990

[54] APPARATUS AND METHOD FOR MONITORING PRESSURE LEAKS FROM A SEALED SYSTEM

[75] Inventor: Jeanne A. Welch, Laurel, Md.

[73] Assignee: The United States of America as represented by the Secretary of the Navy, Washington, D.C.

[21] Appl. No.: 361,074

[22] Filed: Jun. 5, 1989

[51] Int. Cl.[5] .............................................. G01M 3/40
[52] U.S. Cl. ........................................ 73/49.3; 73/705
[58] Field of Search ................... 73/49.3, 52, 705, 753; 356/311, 317, 318

[56] References Cited

U.S. PATENT DOCUMENTS

| | | |
|---|---|---|
| 2,986,037 | 5/1961 | Robinson . |
| 3,438,259 | 4/1969 | Bossert, Jr. . |
| 4,147,431 | 4/1979 | Mann ................................. 73/705 X |
| 4,452,071 | 6/1984 | Eesley et al. ....................... 73/705 X |
| 4,471,661 | 9/1984 | Edwards, Jr. .......................... 73/753 |
| 4,640,136 | 2/1987 | Schmidt ................................. 73/753 |
| 4,652,752 | 3/1987 | Ino et al. ............................. 250/281 |
| 4,667,518 | 5/1987 | Iden ....................................... 73/753 |
| 4,759,630 | 7/1988 | Yuasa et al. ..................... 356/311 X |

*Primary Examiner*—John Chapman
*Assistant Examiner*—Joseph W. Roskos
*Attorney, Agent, or Firm*—Thomas E. McDonnell; George Jameson

[57] ABSTRACT

An apparatus for measuring leaks associated with a sealed lamp assembly, includes an RF source for establishing an ionizing discharge in association with the lamp assembly, a source of continuous-wave probe radiation for irradiating the established ionizing discharge, and a pickup coil and associated circuitry for monitoring current flow through the ionizing discharge in response to the probe irradiation of the ionizing discharge. A signal is provided representing changes in the ionizing discharge resulting from the probe irradiation. A partially reflecting mirror partially deflects a portion of the probe radiation before it reaches the ionizing discharge. A signal is provided representing the deflected probe radiation. A computer receives the signals representing the changes in the ionizing discharge and the signals representing the deflected probe radiation, whereby the computer provides data representing pressure changes in the sealed lamp assembly. The pressure changes are normalized with respect to changes in the source of probe radiation.

14 Claims, 1 Drawing Sheet

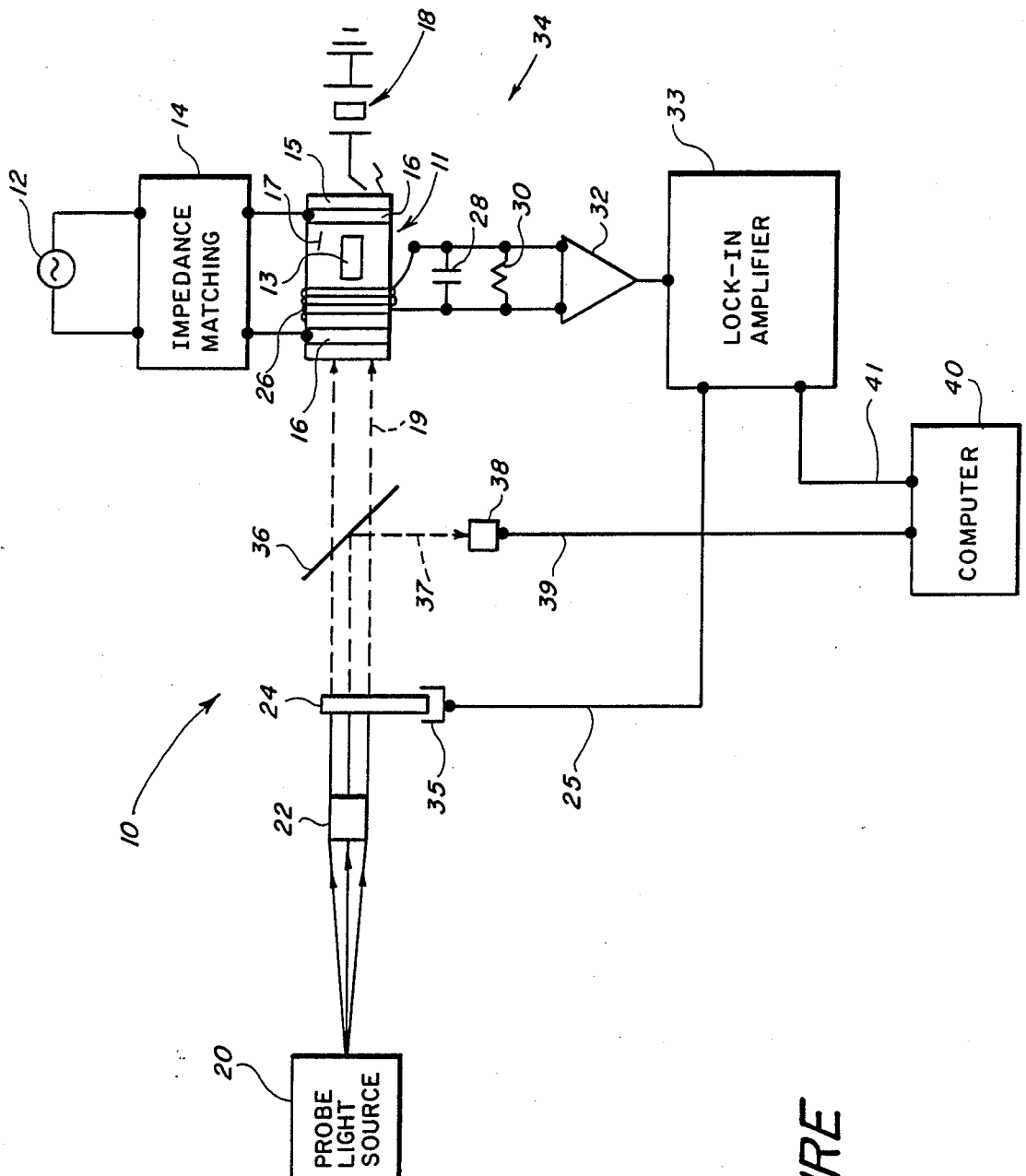
*FIGURE*

APPARATUS AND METHOD FOR MONITORING PRESSURE LEAKS FROM A SEALED SYSTEM

BACKGROUND OF THE INVENTION

The present invention describes herein relates to the field of measuring pressure changes in sealed systems. More specifically, the invention relates to measuring pressure changes in sealed lamps. The invention especially relates to measuring pressure changes due to leaks in sealed lamps used in an infrared jammer. The principles of the invention may also be applied to lamps used in spectroscopy.

Lamps used in infrared jamming and other applications contain evacuated or pressurized gases in a sealed chamber. Such lamps are surrounded by sealed envelopes. When leaks occur into the evacuated chamber, catastrophic lamp failure or implosion may occur resulting in injury to personnel and extensive property damage. Accordingly, it would be desirable to have a device which measures leakage into or out of a sealed envelop to determine the operational status of the lamp and to predict shelf and operating lifetimes without a resultant lamp failure. More specifically, a sealed lamp assembly may be comprised of an inner light source that is surrounded by an outer envelope. The space between the light source and the outer envelope may be evacuated. A device which measures leakage from the light source to the evacuated space defined by the light source and envelop (the enveloped space) would be desirable to determine the operational status of the light source and to predict shelf and operating lifetimes.

In a lamp assembly having an inner light source and an outer envelope, the outer envelope is not designed for a discharge in that there are no electrodes present in the outer envelope. Yet it would be desirable to measure leakage into the enveloped space without physically invading the enveloped space.

A sealed lamp may not have an outer envelope and an enveloped space, but may be a simple sealed bulb of some sort.

Standard prior art vacuum measurement devices such as McLeod, Pirani, thermocouple, or ionization gauges are not suitable for a pressure determination in such a sealed lamp because they would actively interfere or alter the sealed lamp system. No simple modification of such a sealed lamp is possible to accommodate the requirements of the prior art vacuum measurement systems which would require invasion into the sealed lamp. It would be desirable to be able to measure leakage into or out from a sealed lamp without invading the sealed lamp.

There is a phenomenon known as the optogalvanic effect. The optogalvanic effect was first reported by F. M. Penning in Physics, Vol. 8, page 137 (1928). In the optogalvanic effect, a gas is ionized; and, then, the steady-state-discharge is illuminated (probed) with ultraviolet-visible radiation. The change in the extent of ionization due to irradiation is monitored galvanically (by current flow) across the discharge. The galvanic signals (current flow) arise from optical absorption corresponding to nonionizing electronic transitions of the probed species.

The optogalvanic effect received little attention until the work of Green et al. discussed it in Appl. Phys. Lett., Vol. 29, page 5-747 (1976). Since that time, the optogalvanic effect has been used extensively (see Webster et al. Laser Focus, Vol. 19, page 41 (1983)) for high resolution atomic and molecular spectroscopy, laser stabilization and calibration, and chemical analysis. The method has been used successfully for studies involving hollow cathode DC discharges, RF discharges, plasmas, flames and explosions. The optogalvanic effect measurement is quite amenable to diverse irradiation conditions including pulsed, continuous wave, coherent, or broadband sources. Detection circuits are designed to correspond with both the pumping and probing devices.

SUMMARY OF THE INVENTION

Accordingly, it is an object of the present invention to provide a device which measures leakage from a sealed lamp to determine the operational status of the sealed lamp and to predict shelf and operating lifetimes.

Another object of the invention is to provide a device which measures leakage from an inner light source to an evacuated enveloped space to determine the operational status of the inner light source and to predict shelf and operating lifetimes.

Still another object of the invention is to provide means for measuring leakage into or out from a sealed lamp without invading the sealed lamp.

Yet another object of the invention is to provide means for measuring leakage into the enveloped space surrounding a light source without invading the enveloped space.

Another object of the invention is to employ the optogalvanic effect in measuring pressure changes or gas leaks associated with a sealed light source.

Briefly, these and other objects are accomplished by a novel apparatus and method for measuring leaks associated with a sealed system. The novel measuring apparatus includes means for establishing an ionizing discharge in association with the sealed system; means for irradiating the established ionizing discharge; and means for monitoring current flow through the ionizing discharge in response to the irradiating of the discharge. The monitored current flow is indicative of leaks.

More specifically, the means for establishing an ionizing discharge are preferably comprised of means for establishing an RF discharge. The irradiating means are preferably comprised of a source of broadband, chopped, continuous wave, ultraviolet-visible radiation. Preferably, a current monitoring coil is located in close proximity to the sealed system and detects current flow in the ionizing discharge due to the effects of optical energy being absorbed by ions present in the discharge. An amplifier amplifies signals from the current flow detecting coil. Preferably, the amplifier is referenced to the irradiating means.

In accordance with the invention, a novel method is provided for measuring leaks associated with a sealed system. With the method, a space associated with the sealed system is exposed to energy capable of establishing an ionizing discharge. Then, the energy exposed space is irradiated causing optogalvanic current flow through the energy exposed space when an ionizing discharge occurs. The optogalvanic current through the discharge is monitored. As the pressure associated with the sealed system changes, the optogalvanic current through the associated ionizing discharge also changes. The monitored optogalvanic current is related to the pressure changes and indicative thereof. By correlating these pressure changes of the sealed system to data representing pressure changes versus service life in sealed systems used for calibration, prediction of service lifetimes of sealed systems such as lamps is readily obtained. By being able to more accurately predict lamp service life, more service may be realized from a given lamp without undergoing a dangerous failure or explosion.

Other objects, advantages and novel features of the invention will become apparent from the following detailed description of the invention when considered in conjunction with the accompanying drawing herein.

BRIEF DESCRIPTION OF THE DRAWINGS

In the drawing, the Figure shows a schematic drawing of an embodiment of the invention employing an RF discharge.

DESCRIPTION OF THE PREFERRED EMBODIMENT(S)

With reference to the Figure, an apparatus 10 for measuring the pressure in a sealed lamp assembly 11 is shown. Sealed lamp assembly 11 includes a sealed light source 13 surrounded by envelope 15. Enveloped space 17, which is between the light source 13 and the envelope 15, is evacuated to a pressure lower than the pressure inside sealed light source 13. Energy capable of establishing an RF discharge is generated by an RF transmitter 12. The impedance of the transmitter 12 is matched by impedance matching circuitry 14 to the impedance of two metal rings 16 placed directly on the outside of the envelope 15. The RF energization is initialized with the aid of a piezolelectric starter 18.

Probe radiation 19 is provided by a continuous wave light source 20 whose light passes through collimator 22 and chopper 24 before the probe light is directed into the enveloped space 17. An RF discharge takes place in the enveloped space 17 when gases leak out from light source 13 into the enveloped space 17. In the absence of probe light 19 from probe source 20, a certain amount of baseline ionization in the enveloped space 17 would take place when ionizable gases are present in the enveloped space 17. However, under the influence of the probe light 19, the baseline ionization would be increased or decreased, depending upon the specific nature of the gases and the RF energy involved. More specifically, the RF discharge region is between the rings 16 located on the outside of the envelope 15. The rings 16 do not invade the interior of the envelope 15, the enveloped space 17, or the light source 13.

Optogalvanic current generated by the probe light 19 falling upon the discharge region is detected with a pick-up circuit 34 which includes a coil 26 (wrapped around the envelope 15) and a capacitor 28, a ballast resistor 30, and a tuned amplifier 32, all connected in parallel to the coil 26. The resulting AC component of the galvanic signal is then measured with a lock-in amplifier 33 which is referenced to the chopper 24 through line 25. The lock-in amplifier 33 receives a signal from light detector 35 only when chopped light passes through chopper 24; and, the lock-in amplifier 33 holds the received signal until the next segment of chopped light causes the amplifier 33 to receive another signal.

The intensity of the probe light source 20 is monitored by deflecting or splitting off a portion of the collimated and chopped radiation with a partial reflector 36. The deflected or split off light 37 is detected by photodiode 38. Both the output of the photodiode 38, through line 39, and the optogalvanic signals from the lock-in amplifier 33, through line 41, are processed by minicomputer 40.

To calibrate the apparatus of the invention with respect to absolute pressure values in a sealed lamp assembly or sealed light source, a plurality of sealed glass reference tubes (not shown) containing known pressures for the sample of interest are used. The dimensions of the glass reference tubes should be identical to those of the sealed lamp assembly or sealed light source to be tested. A calibration curve is obtained that relates measured optogalvanic current to the known pressures in the reference tubes. Then, an in service sealed lamp assembly or sealed light source can be monitored with respect to changes in optogalvanic current that are measured, and the changes in optogalvanic current are related to the calibration curve to determine pressure changes in the in service unit. The calibration information can be retained in the minicomputer 40, and pressure changes can be computed therein to provide data indicative of the computed pressure changes.

The main purpose of partial reflector 36, split off light 37, photodiode 38, and line 39 is to provide the computer 40 with data representing the constancy or variability of the probe light source 20. The calibration of pressure versus optogalvanic current depends upon a baseline intensity of probe light from the probe light source 20. During use, however, due to aging, power surges or replacement with another probe light source, the baseline intensity of the probe light source 20 can change. However, by sampling the probe light source, any changes in baseline intensity can be compensated for (or normalized), by computation in the computer 40 so that the calibration with respect to lamp pressures will not be skewed.

The RF discharge method facilitates leakage detection from a system having an enveloped, evacuated space 17 because it can be engineered and adjusted to measure the RF current only in the enveloped space through careful coil 26 placement. For example, it has been discovered that the most unobstructed pathway for the probe light 19 is achieved if the coil 26 is located nearer to the cathode end of the seal lamp assembly 11 than the other end. Such coil 26 placement is shown in the Figure. The RF method allows discharges to be maintained at pressures that are lower than those required for DC discharge, thereby, extending the dynamic range of the measuring device.

With an RF discharge probed with chopped continuous wave radiation as described above, the galvanic signals are easily detected with the pickup circuit 34. The probing radiation is preferably from a broadband source because only the magnitude of the galvanic signal is measured. No atomic or molecular spectra are desired. When a lamp is used to irradiate the discharge, all available resonant transitions are excited simultaneously. The combined galvanic signal arising from all of the transitions will be large and easily measured.

Ideally, a constant probe light source output should be maintained. However, under real conditions, the output of the probe light source may change over time, and the optogalvanic results should be normalized to the lamp output to correct for probe light source decay.

For any detector/irradiation source combination, monitoring the impedance change as a function of pressure for a fixed geometry in a testing device yields a calibration curve. An absolute reference point for this device is established with the measurement of a known pressure of the sample of interest. Comparison of the calibrated optogalvanic results to the signal observed from an operating system yields a pressure measurement of the operating system.

The pressure measuring technique of the invention has increased sensitivity over other measuring devices because of the inherent sensitivity of the optogalvanic effect. Repeatable sensitivity to one part per billion is possible.

Although the embodiments of the invention described thus far provide a system for measuring pressure changes in a sealed lamp assembly or sealed light source, other sealed pressure chambers can be used. For example, the apparatus and method of the invention can be employed in monitoring leakage from sealed containers storing radioactive or other hazardous gases. The apparatus and method of the invention may also be used in monitoring gas leakage from a gas-confining structure such as a gas pipeline.

Furthermore, with appropriate configuration, the apparatus of the invention can be used not only to measure the pressure in a sealed system but also to determine the nature of the components present in the system through direct spectroscopic identification.

Although RF radiation is preferred for establishing the discharge, DC discharges may also be employed.

Numerous benefits are obtained from following the principles of the present invention. With the invention, a device employing the optogalvanic effect is provided which measures pressure changes in and, thereby, leakage from a sealed lamp chamber, without invading the sealed lamp chamber. With the invention, one may determine the operational status of the sealed lamp and predict shelf and operating lifetimes.

With the invention, a device is provided which measures leakage from a sealed inner lamp chamber to an outer evacuated envelope without invading the sealed inner lamp chamber.

It will be understood that various changes in the details, steps and arrangement of parts which have been wherein described and illustrated to explain the nature of the invention, may be made by those skilled in the art within the principles and scope of the invention as expressed in the appended claims.

What is claimed is:

1. An apparatus for measuring leaks associated with a sealed system, comprising:
    means for establishing an ionizing discharge in association with said sealed system,
    means for irradiating the established ionizing discharge, and
    means for monitoring current flow through the ionizing discharge in response to the irradiation of the discharge.

2. The apparatus described in claim 1 wherein said means for establishing an ionizing discharge is comprised of means for establishing an RF discharge.

3. The apparatus described in claim 1 wherein said irradiating means is comprised of a source of continuous wave, ultraviolet-visible radiation and means for chopping radiation from said radiation source.

4. The apparatus described in claim 1 wherein said current flow monitoring means is comprised of means, located in close proximity to the sealed chamber, for detecting current flow in the ionizing discharge and means for amplifying signals from said current flow detecting means.

5. The apparatus described in claim 4 wherein said amplifying means are referenced to said radiation chopping means.

6. A method for measuring leaks associated with a sealed system, comprising the steps of:
    establishing an ionizing discharge in association with the sealed system,
    irradiating the established ionizing discharge,
    monitoring current flow through the ionizing discharge in response to the irradiating of the discharge.

7. The method described in claim 6 wherein said step of establishing an ionizing discharge produces an RF discharge.

8. The method described in claim 6 wherein said irradiating step is carried out with continuous wave, ultraviolet-visible radiation that is chopped.

9. The method described in claim 6 wherein said monitoring step is carried out by means, located in close proximity to the sealed chamber, for detecting current flow in the ionizing discharge and means for amplifying signals from the current flow detecting means.

10. The method described in claim 9 wherein the amplified signals are referenced to a radiation chopping means.

11. An apparatus for measuring leaks associated with a gas-confining system, comprising:
    means for establishing an ionizing discharge in association with the gas-confining system,
    means for irradiating the established ionizing discharge, and
    means for monitoring current flow through the ionizing discharge in response to the irradiating of the discharge.

12. An apparatus for measuring leaks associated with a sealed lamp, comprising:
    means for establishing an ionizing discharge in association with the sealed lamp,
    probe radiation means for irradiating the established ionizing discharge, said probe radiation means including a source of continuous wave radiation and including means for chopping radiation from said radiation source,
    means for monitoring current flow through the ionizing discharge in response to the probe irradiating of the discharge, said current flow monitoring means including,
    coil means, located in close proximity to the sealed lamp, for detecting current flow in the ionizing discharge, and
    means, referenced to said radiation chopping means, for amplifying signals from said coil means,
    means for monitoring said probe radiation means, said probe radiation monitoring means including,
    means for partially deflecting a portion of the probe radiation before reaching said ionizing discharge, and
    means for providing signals in response to the partially deflected radiation, and
    computer means for receiving signals from said probe radiation monitoring means and for receiving signals from said current flow monitoring means, said computer means providing data representing pressure changes in the sealed lamp.

13. For a sealed lamp assembly which includes a light source, an envelope, and an enveloped space between the light source and the envelope, an apparatus for measuring leaks from the light source to the enveloped space, the apparatus, comprising:

means for establishing an ionizing discharge in the enveloped space, probe radiation means for irradiating the established ionizing discharge, said probe radiation means including a source of continuous wave radiation and including means for chopping radiation from said radiation source, means for monitoring current flow through the ionizing discharge in response to the probe irradiating of the discharge, said current flow monitoring means including, coil means, located on the outside of the envelope, for detecting current flow in the ionizing discharge in the enveloped space, and means, referenced to said radiation chopping means, for amplifying signals from said coil means, means for monitoring said probe radiation means, said probe radiation monitoring means including, means for partially deflecting a portion of the probe radiation before reaching the ionizing discharge, and means for providing signals in response to the partially deflected radiation, and computer means for receiving signals from said probe radiation monitoring means and for receiving signals from said current flow monitoring means, said computer means providing data representing pressure changes in the sealed lamp assembly.

14. A method for monitoring pressure changes associated with a sealed system that may leak, the method comprising the steps of:

establishing an ionizing discharge in association with the sealed system, irradiating the established ionizing discharge with probe radiation from a radiation source, providing signals representing monitored current flow through the ionizing discharge in response to the probe irradiating of the discharge, providing signals representing monitored probe radiation prior to irradiating the ionizing discharge, computing data representing pressure changes due to leaks from the sealed system based on the signals representing monitored current flow through the ionizing discharge and based on the signals representing monitored probe radiation whereby computed pressure changes are normalized with respect to changes in the radiation source.

* * * * *